United States Patent [19]

Svendsen et al.

[11] Patent Number: 5,134,532
[45] Date of Patent: Jul. 28, 1992

[54] MULTIPLE-DISK STORAGE SYSTEM

[76] Inventors: Peter R. Svendsen, 1430 Oak Hills Dr.; Charles M. Riggle, 12995 Morris Trail, both of Colorado Springs, Colo. 80919

[21] Appl. No.: 607,768
[22] Filed: Oct. 30, 1990

Related U.S. Application Data

[63] Continuation of Ser. No. 372,666, Jun. 28, 1989, abandoned.

[51] Int. Cl.$^5$ .......................... G11B 5/55; G11B 21/08
[52] U.S. Cl. .................................. 360/106; 360/78.04
[58] Field of Search .................... 360/106, 78.04–78.12

[56]  References Cited

U.S. PATENT DOCUMENTS 4,544,972  10/1985  Kogure et al. ...................... 360/106

Primary Examiner—Robert S. Tupper
Attorney, Agent, or Firm—Cesari and McKenna

[57]  ABSTRACT

A disk drive system which has a plurality of disks and a plurality of transducing head positioning across. The arms are mounted about common shaft for independent notation to desired radial position on the disk.

9 Claims, 5 Drawing Sheets

MULTIPLE-DISK STORAGE SYSTEM

This invention is a continuation of prior application Ser. No. 07/372,666, filed Jun. 28, 1989, now abandoned.

REFERENCE TO RELATED APPLICATION

U.S. patent application of C. M. Riggle et al., Ser. No. 07/343,907, filed Apr. 26, 1989, now U.S. Pat. No. 5,016,131, for Integral Balanced-Moment Disk Positioner, the disclosure of which is incorporated herein by reference.

FIELD OF THE INVENTION

This invention relates to the mass storage of digital data. More particularly it relates to a disk drive having multiple disks with arms that rotate to position read/write heads on data tracks on the respective disk surfaces. In accordance with the invention the arms are moved independently of each other.

BACKGROUND OF THE INVENTION

It is common to configure a disk drive with multiple disks that rotate on a common spindle. A disk drive of this type has a read/write assembly in which read/write heads are mounted on actuator arms that are fixed to a common shaft or housing which is rotated to position the heads on respective circular data tracks on the disk surfaces.

The multiple-disk arrangement provides two important advantages. The first of these is compactness and relatively low cost. The second advantage relates to the speed of data access. Specifically, the data in consecutive logical locations is physically located in "cylinders", i.e. series of tracks having the same radii but disposed on a succession of disk surfaces. Since the read/write heads move in unison, they are, at any given time, located over tracks in the same cylinder. Thus, when data occupying more than one track in a cylinder is to be accessed, the data in the first track is retrieved by means of a read/write head positioned on that track and the system then switches to another head which is already positioned on the track carrying the next portion of the data to be retrieved.

This should be contrasted with a single disk surface, where the head must be repositioned radially whenever data from another track is to be accessed. This repositioning or "track seeking" operation is relatively slow in the context of the data transfer rates involved in disk storage and retrieval. Thus the reduction in the number of such operations provided by multiple-disk arrangements materially improves the overall speed of operation.

The evolution of disk drives has been characterized by continual increases in the density of data stored on the disks, in terms of both the number of bits per track and the spacing of the tracks. Unfortunately this can significantly increase the time required to switch from one read/write head to another. Ideally, the heads are simultaneously in position on the respective tracks in the same cylinder as described above. However, temperature changes cause small variations in the radial positions of the various read/write heads. With a high track-density and the concomitant requirement for highly precise radial positioning of the read/write heads, this variation can cause a head to be out of position radially even though another head is centered on a data track. Accordingly, even when the system switches from one head to another for operation in the same cylinder, it must wait for the head-positioning servo system to move the head assembly so as to center the second head on a track.

SUMMARY OF THE INVENTION

In a disk drive incorporating the present invention the actuator arms are mounted for rotation on a common shaft. However, unlike the prior multiple-arm arrangements, they are not locked to the shaft. Rather, they are independently rotatable thereon and they are provided with independent servo positioning systems so that they can be positioned independently of each other. Thus, when the system switches from one read/write head to another in the same cylinder, the second head can already be positioned over the appropriate track, thereby essentially eliminating the head positioning time required with the prior drives in which the positioning arms move in unison.

Moreover, with the invention, head switching does not require that the second head be positioned in the same cylinder as the first head. Thus, in those instances where the next physical location to be accessed by the positioning system is in a different cylinder a head can be independently repositioned to that cylinder, thereby eliminating or at least materially reducing the track-to-track positioning time normally required for such a move. This resolves another problem resulting from the requirement for large data storage capacity in disk systems. As the data density in the systems increases, it is possible for a single drive to have the capacity that previously required several disk drives. However, with multiple disk drives the data can be independently accessed and this permits the use of interleaving strategies in which large files are stored in alternate cylinders on more than one drive. That is, heads on one drive can be repositioned while data is being read from, or written to, another drive. The invention permits the use of these strategies in a single disk drive and thus permits one to take advantage of the large capacity now available without giving up these addressing strategies. At the same time the system described herein can be balanced in accordance with the invention disclosed in the above-cited Riggle et al. application.

In multi-task systems, the invention is beneficial even where small files are involved. Multiple disk drives have been used in such systems because they permit multi-stream disk access. That is, while one task is engaged in a disk reading or writing operation on one drive, other tasks can engage in repositioning operations on other drives, thereby materially decreasing the waiting time for disk access by the latter tasks. Again, the invention permits the use of this multi-streaming strategy in a single drive.

Independent head positioning in a multiple-disk system has been accomplished in the past. However, one of these systems makes use of linear actuators which, because of the geometries involved, materially limit the number of positioners. Moreover, this configuration is relatively cumbersome and expensive as compared with the present invention in which the rotary actuators are stacked in a compact arrangement on a single shaft.

In another prior system, actuator arms, which are tied together to move in unison, carry micropositioners on which the read/write heads are mounted. The micropositioners are independently controlled, thereby providing some independence of head positioning. However, their range is limited to a few tracks and they are thus incapable of the interleaving and multi-streaming strategies discussed above. Also this system is complex and expensive and it cannot readily be balanced in the manner described in the above-cited patent application.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
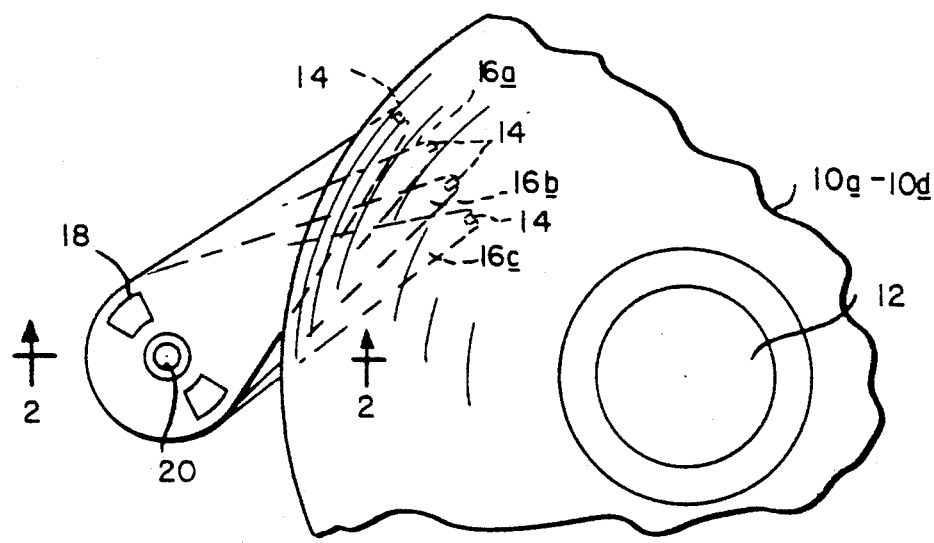
FIG. 1 is a top view of a disk drive incorporating the invention.
Figure 2:
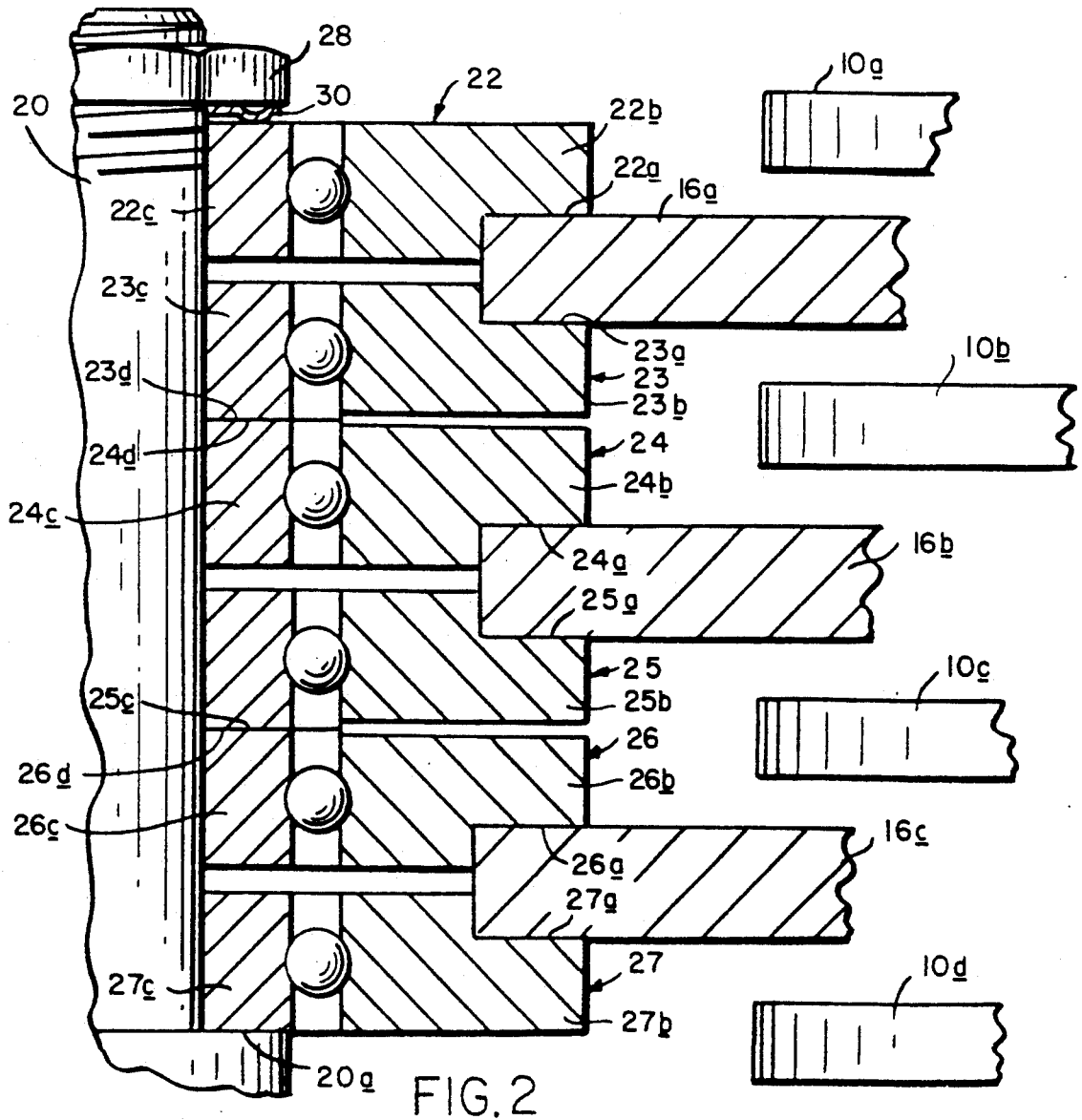
FIG. 2 is a fragmentary vertical section of the disk drive, taken along the line 2—2 of FIG. 1 and showing the bearing structure of the drive.

As shown in FIGS. 1 and 2, a disk drive embodying the invention has a stack of disks 10a–10d mounted for rotation together on a common spindle 12. The disks may, for example, be coated with suitable magnetic material which permits the recording of information magnetically in a digital format. The invention however is not limited to the use of a magnetic recording medium. For example, a multiple-disk system using optically recorded and sensed data is fully amenable to the practice of the invention.

Data on the disks 10 is recorded and retrieved by means of read/write heads 14 mounted on actuator arms 16a–16c. The arms 16 are driven by separate motors 18 for independent rotation about a shaft 20. Thus the heads 14 on the respective arms can be positioned in the same or different cylinders in the disk stack.

FIG. 2 illustrates a bearing system that supports the actuator arms 16 on the shaft 20. The actuator arms 16 are clamped in the outer races of bearing pairs 22,23; 24,25 and 26,27, which are stacked against a shoulder 20a of the shaft and secured in place by means of a nut 28 and pre-loading spring washer 30. More specifically the arm 16a is clamped in annular notches 22a and 23a in bearing outer races 22b and 23b. Arms 16b and 16c are similarly clamped in the outer races 24b and 25b and 26b and 27b. The outer races of the adjacent bearings are spaced apart. However, the inner race 23c has a downward projection 23d that abuts an upward projection 24d of the inner race 24c. Similarly, a downward projection 25d of inner race 25c abuts an upward projection 26d of inner race 26c.

Accordingly, the clamping force provided by the nut 28 and spring 30 is applied to the bearing inner race 22c and thence through the outer race 22b through the actuator arm 16a to the outer race 23b. From the race 23b the clamping force passes through the inner race 23c to the inner race 24c, the outer race 24b, the actuator arm 16b and the outer race 25b to the inner race 25c. From the inner race 25c, the force passes to inner race 26c, the outer race 26b, the actuator arm 16c, the outer race 27b and inner race 27c to the shoulder 20a. In a modification of the foregoing structure the inner race projections 23d, etc. can be replaced by washers so that the inner races and outer races have the same vertical dimensions.

Figure 3:
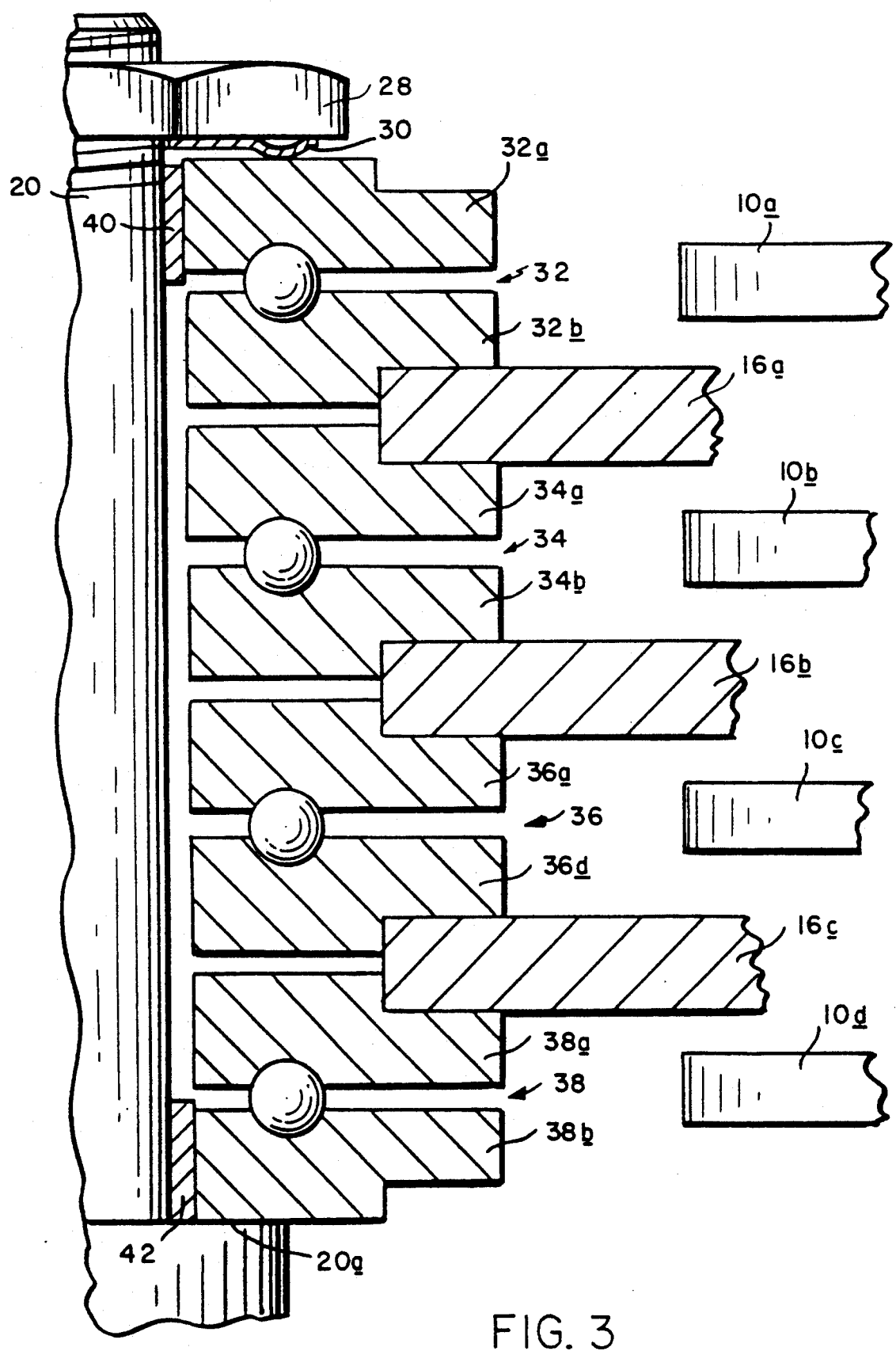
FIG. 3 is a view similar to that of FIG. 2, of another embodiment of the bearing structure.

FIG. 3 illustrates a bearing structure making use of a stack of thrust bearings 32–38. The actuator arm 16a is clamped in annular notches in the lower plate 32b of bearing 32 and the upper plate 34a of the bearing 34. Similarly, the arm 16b is clamped between bearing plates 34b and 36a and the arm 16c is clamped between bearing plates 36b and 38a. The lower plate 38b of the bearing 38 rests on the shaft shoulder 20a and the bearing stack is forced against the shoulder by means of the nut 28 and the spring 30 which, in this case, engages the upper bearing plate 32a. The inner diameters of the bearings 32–38 are greater than the diameter of the shaft 20 to provide clearance for the bearing plates that rotate with the actuator arms 16. A pair of sleeves 40 and 42, disposed within the non-rotating bearing plates 32a and 38b, serve as spacers to center the bearing stack on to the shaft.

Figure 4A:
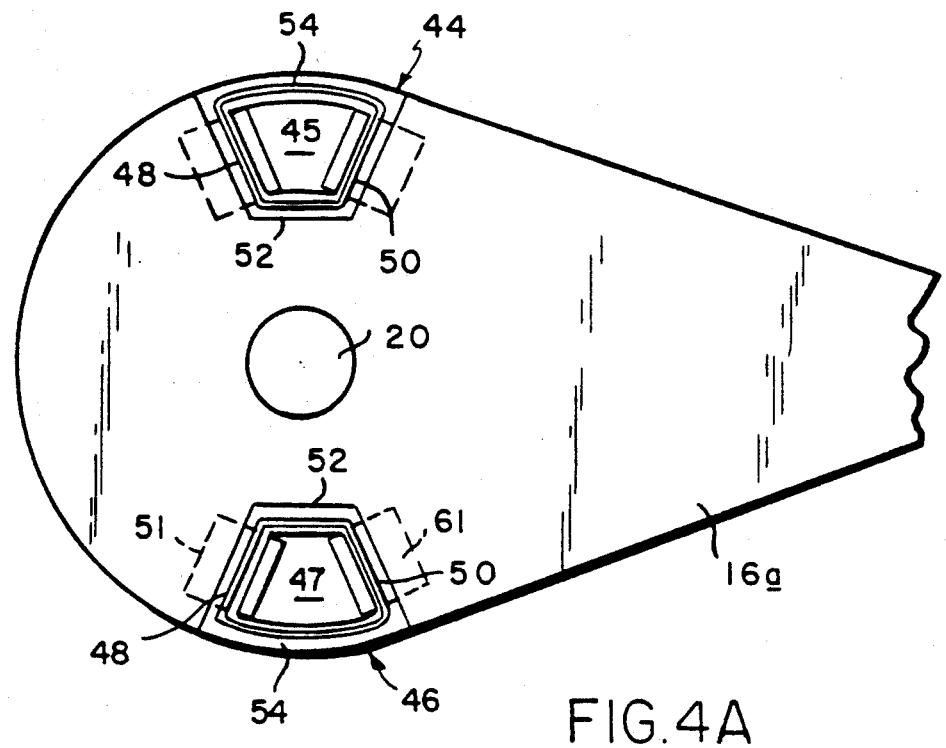
FIG. 4A is a fragmentary top view of the drive showing the structure of the actuators used in the disk drive.
Figure 4B:
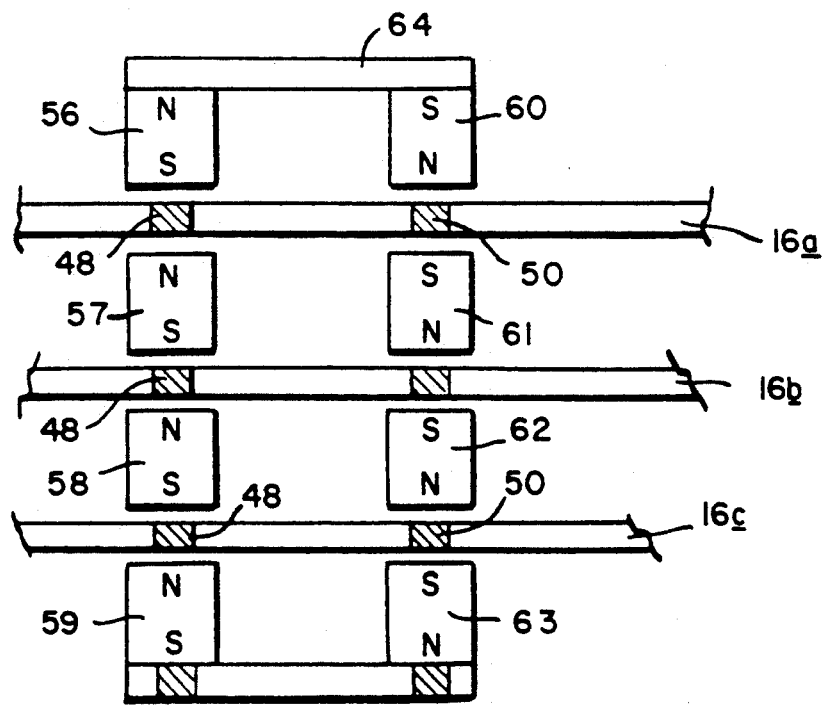
FIG. 4B is a side view of the actuator arrangement of FIG. 4A.

FIGS. 4A and 4B illustrate the preferred motor arrangement for the actuators 16. Each of the actuator arms carries a pair of diametrically opposed coils 44 and 46 arrayed, as shown, around apertures 45 and 47, with radially extending legs 48 and 50 and transverse legs 52 and 54. The currents in the legs 48 and 50 interact with the magnetic flux provided by a stack of magnets to generate the torque that rotates the arms. FIG. 4B illustrates the magnet arrangement for the coils 46, an identical magnetic structure interacting with the coils 44. A series of magnets 56–59, interleaved with the actuator arms 16, passes the magnetic flux upward through the radial coil legs 48. Similarly, a series of magnets 60–63 passes a magnetic flux in the opposite downward, direction through the coil legs 50. The flux path for the magnet system is completed by bridging bars 64 and 66 at the top and bottom. To simplify the drawing we have omitted therefrom the supporting structure for the magnets. This structure, which is disposed outwardly from the actuator arms, has brackets that extend inwardly to support the magnets and bridging bars.

By way of illustration, assume a counterclockwise current (FIG. 4A) in the coil 46. The current in the leg 48 for that coil will interact with the flux between the magnets 56 and 57 to provide a force to the left (FIG. 4B) and the current in the leg 50 will interact with the flux between the magnets 60 and 61 also providing a leftward force. The current will thus provide a clockwise torque on the actuator 16a. At the same time, a current of equal magnitude is passed through the coil 44 to provide rightward force and thus a clockwise torque. The torques generated by the currents in the coils 44 and 46 thus add, while the forces are in the opposite direction. Thus the motor imposes no net force on the shaft 20.

Figure 5A:
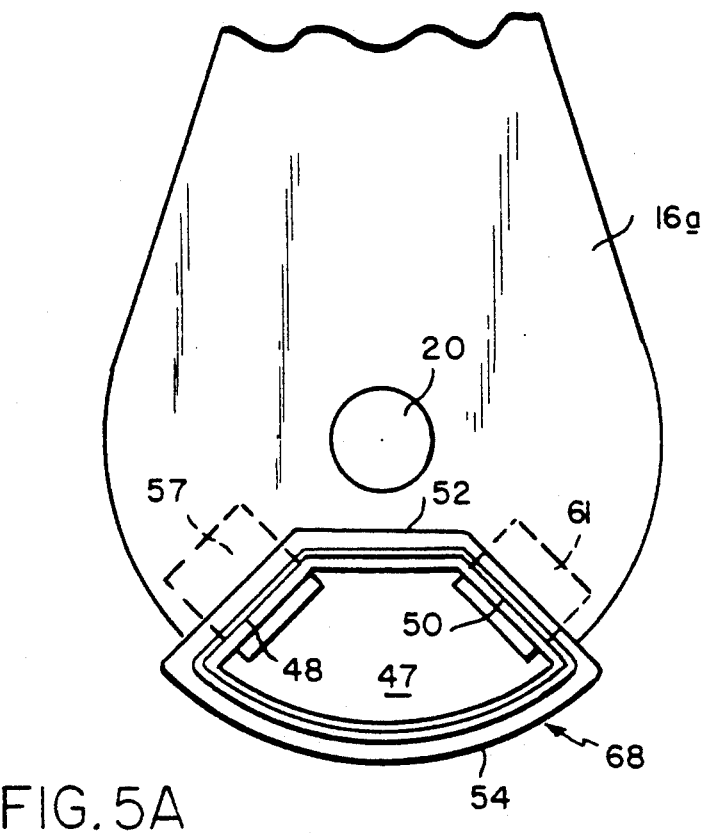
FIG. 5A is in top view of another embodiment of the actuator.
Figure 5B:
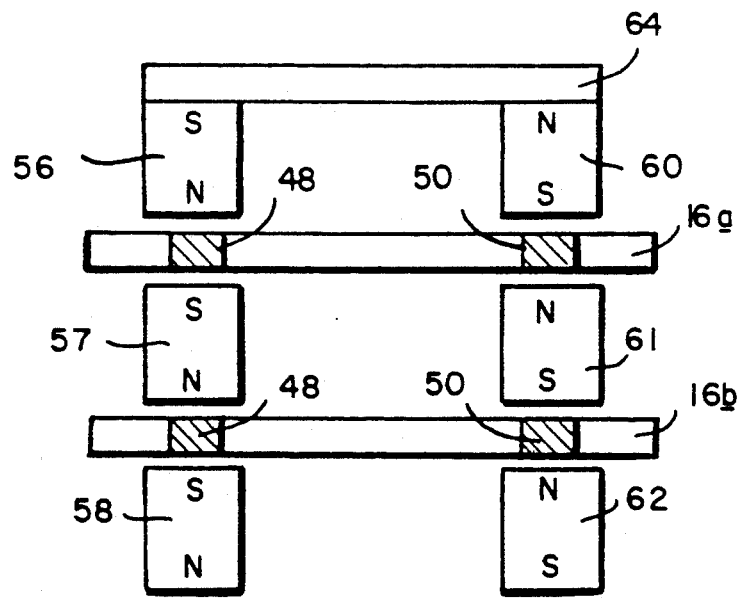
FIG. 5B is a fragmentary end view of the actuator of FIG. 5A.

FIGS. 5A and 5B illustrate another motor arrangement in which each of the actuator arms is provided with a single coil 68. Currents in the radial legs 48 and 50 interact with the magnetic flux provided by the magnets 56, 57, etc., as described above, to provide the requisite torque. With this configuration, the mass of the coils can provide a counterweight for the moving mass at the center of rotation.

Figure 6A:
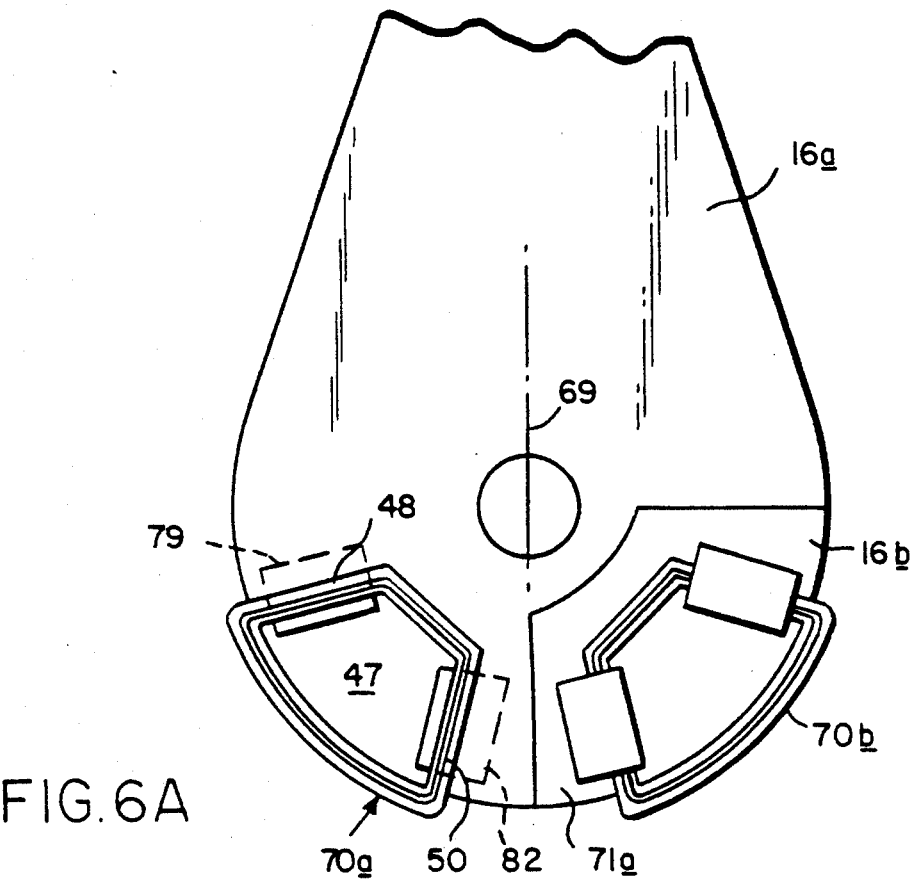
FIG. 6A is a top view of a third embodiment of the actuator.
Figure 6B:
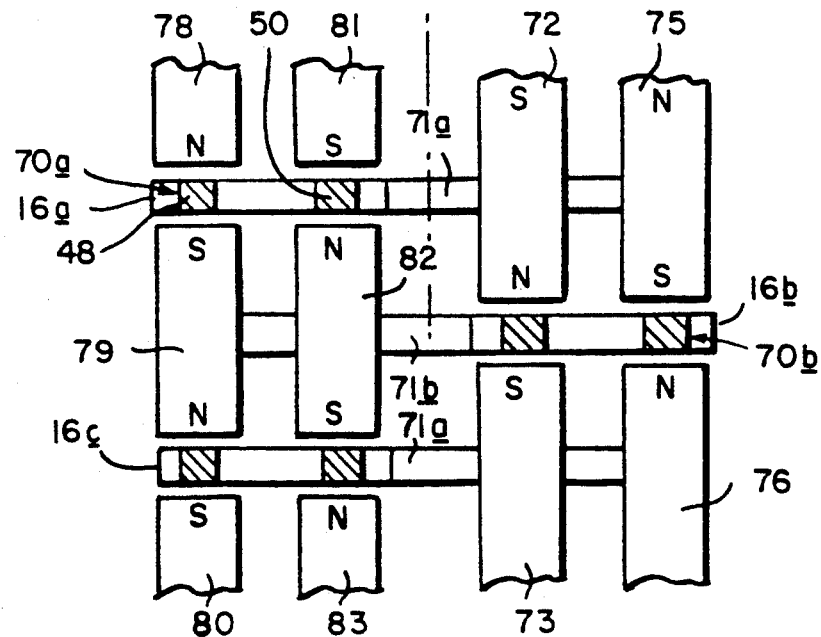
FIG. 6B is an end view of the actuator of FIG. 6A.

FIGS. 6A and 6B illustrates an embodiment of the invention in which the motor magnets are elongated relative to those of the other embodiments and therefore provide a higher torque constant in the same volume. The actuator 16a carries a single coil 70a offset to the left (FIG. 6A). On the opposite side of the arm centerline 69, a corresponding, right-hand sector of the actuator is cut away to provide an aperture 71a, with elongated magnets 72 and 75 extending upward therethrough. Conversely the actuator 16b carries a coil 70b offset to the right with a corresponding aperture 71b on the left that accommodates magnets 79 and 82. Finally, the actuator arm 16c is configured like the arm 16a and thus has an aperture 71a that accommodates magnets 73 and 76.

Accordingly the current in the coil 70a interacts with the flux in the gaps between the magnets 78 and 79 and 80 and 82, respectively, while current in the coil 70b interacts with the flux in the gaps between the magnets 72 and 73 and 75 and 76 respectively. Current in the coil 70a carried by the actuator 16c interacts with the flux in the gaps between the magnets 79 and 80 and 82 and 83 respectively. It will be apparent that for each of the motor coils in FIGS. 6A and 6B the volume in the magnet flux paths occupied by the permanent magnets is greater than in the other embodiments of the invention, with a resulting greater torque.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A disk drive comprising
   A. a spindle,
   B. a plurality of data storage disks mounted on said spindle for rotation therewith,
   C. a plurality of head-positioning arms carrying heads for reading and/or writing data on surfaces of said disks,
   D. means mounting said arms for independent rotation about a common shaft, and
   E. means for independently rotating said arms to position said heads at desired radial positions on said disks.

2. The disk drive defined in claim 1 in which said rotating means are electric motors comprising
   A. coils on said arms, and
   B. stationary magnets,
   currents in said coils interacting with the fluxes generated by said magnets to provide torques for rotation of said arms.

3. The disk drive defined in claim 2 in which
   A. each of said coils has legs oriented with a radial component relative to such shaft, and
   B. said magnets generate flux parallel to such shaft and passing through said coil legs.

4. The disk drive defined in claim 3 including a pair of coils on each of said arms, the coils in each pair being diametrically disposed relative to said shaft, whereby the forces generated by currents in said coils are in opposite directions.

5. The disk drive defined in claim 3 including a single coil on each of said arms, said coil being disposed on the opposite side of said shaft from the heads carried on the arm.

6. The disk drive defined in claim 3 in which said magnets are disposed in stacks interleaved with said arms.

7. The disk drive defined in claim 3
   A. including a single coil on each arm on a first side of the center line of the arm and an aperture in the arm in the corresponding position on the opposite side of said center line,
   B. in which the coils on successive arms are on opposite sides of said center line, and
   C. in which said magnets are disposed in stacks interleaved with said arms, with the magnets extending through said apertures.

8. The disk drive defined in claim 1 in which said mounting means comprises
   A. a stack of bearings, each of which has an inner race and an outer race,
   B. the outer races of adjacent bearings being spaced apart,
   C. the outer races of successive pairs of bearings having opposing annular notches accommodating said arms, and
   D. means applying a clamping force to the inner races at the ends of said stack, said force being transmitted between pairs of bearings by way of said inner races.

9. The disk drive defined in claim 1 in which said mounting means comprises
   A. a stack of thrust bearings, each of which has a top plate and a bottom plate accommodating balls for relative rotation of the plates,
   B. adjacent plates of adjacent bearings having opposed annular notches accommodating said arms, means applying a clamping force to the plates at the ends of which stack thereby to clamp said arms to said bearings.

* * * * *